April 8, 1930.  C. TRAVIS  1,753,486
ELECTRICAL MEASURING APPARATUS
Filed May 3, 1927
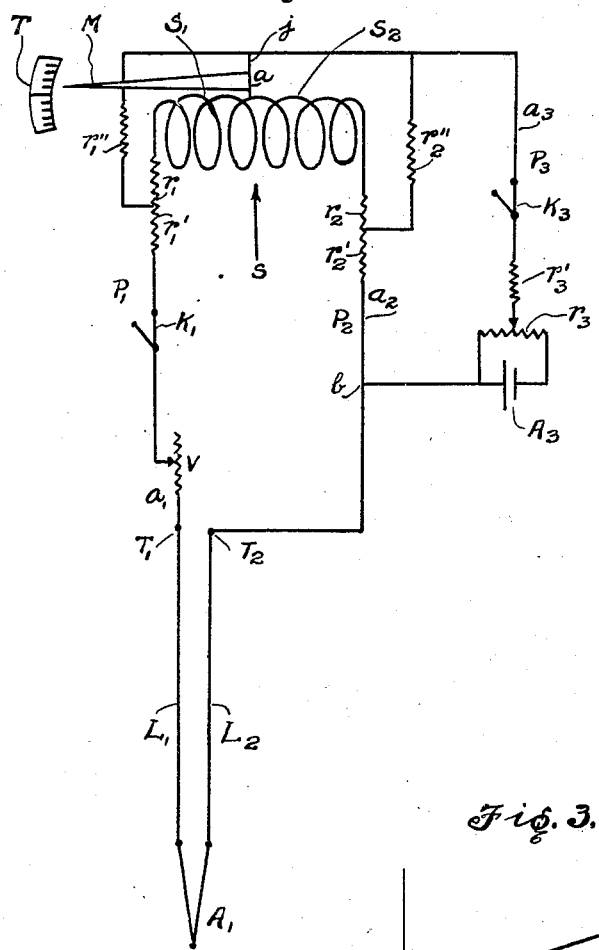
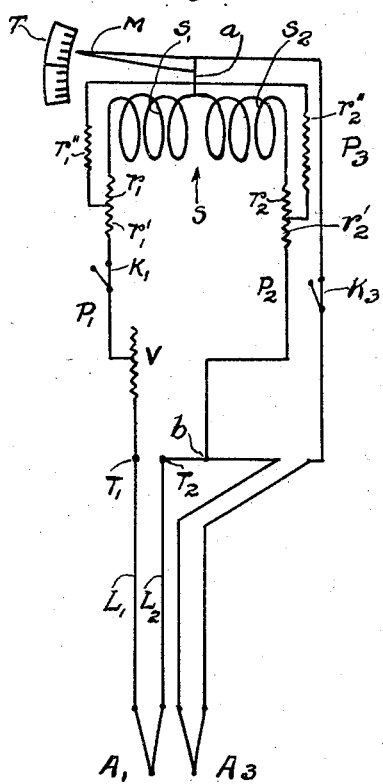
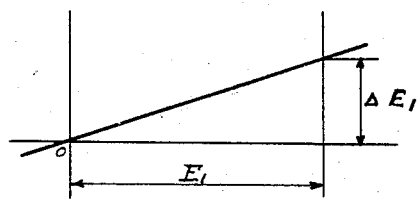
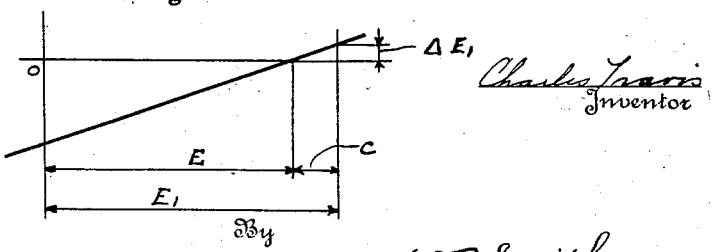
Charles Travis
Inventor
By W. E. Smith
Attorney Patented Apr. 8, 1930

1,753,486

UNITED STATES PATENT OFFICE

CHARLES TRAVIS, OF PHILADELPHIA, PENNSYLVANIA

ELECTRICAL MEASURING APPARATUS

Application filed May 3, 1927. Serial No. 188,507.

It is the object of the present invention to minimize or to eliminate the errors concomitant with the use of galvanometers, the present invention being particularly directed to the elimination of the errors due to the variation of the resistances of the circuits involved arising from the use at various times of external conductors of different resistance, and from changes in temperature conditions, and of the condition of the various electrical contacts.

While the present invention may be applied to any type of galvanometer, it has particular advantages when applied to and combined with galvanometers used in pyrometry for measuring the electromotive forces generated by the thermo couples utilized.

The object and operation of my invention will be understood from the following considerations.

In the common type of galvanometer or millivoltmeter, where the deflective coil is connected directly across the electromotive force which is to be measured, the current flowing in the deflecting or measuring coil is $$C = \frac{E_1}{R} \quad (1)$$

where $E_1$ is the magnitude of the unknown E. M. F., and R is the total resistance of the circuit, including the internal resistance of the instrument, the resistance of the leads, and that of the source of the E. M. F.

The deflection of the instrument is proportional to the current C flowing in the instrument and is therefore inversely dependent upon the value of R. But R is variable, the variation arising chiefly in the external circuit and due to variations in the material, diameter, length, and temperature of the lead wires used at different times, or to variations in the resistance of the source of the E. M. F. and of the electrical contacts and connections. A greater or less error in the indicated value of $E_1$ thereby results.

If the instrument has been calibrated for a total resistance $R+r$, whereas the actual resistance at another time is R, the magnitude of the error at such time will be $$\Delta E_1 = \frac{E_1(R+r)}{R} - E_1 = E_1 \frac{r}{R} \quad (2)$$

In pyrometry, this error is very troublesome in practice. To reduce it to a sufficiently samll magnitude various expedients are employed all with certain disadvantages. For example, the lead wires may be made with low resistance. This prohibits the use of so called extension leads for carrying the cold junction of the thermo couple back to the instrument, as such extension leads in practice, are necessarily materials of high specific resistance. Or the internal resistance of the instrument may be made very great. This has the effect of reducing the current flowing in the circuit, and necessitates a corresponding sensitivity in the instrument, which is accompanied by a necessary lack of sturdiness and by a liability to mechanical derangement. Or again the resistance of the external circuit may be adjusted in each individual case by a system of resistance either shunt or series. This expedient is laborious to carry out, and further, the individual adjustments are often lacking in permanence for various reasons.

It is the object of the present invention to provide a system for measuring electromotive forces in which the errors indicated above are eliminated or reduced to a minimum.

The above object is accomplished in the present invention by introducing in the circuit an additional source of E. M. F. in such a manner that a counter E. M. F. is produced across the terminals of the source of unknown E. M. F. equal or approxiately equal and opposite to the unknown E. M. F. whereby the current flowing in the external circuit is correspondingly reduced, and by providing means whereby the introduced counter E. M. F. may be made substantially equal to the magnitude of the unknown E. M. F. for various values of the latter quantity.

The invention will be more readily understood from the appended claims, which set forth the principle of the invention and from the drawing in which—

Figure 1 illustrates one embodiment of the invention and Figure 2 another embodiment of the invention.

Figures 3 and 4 are diagrammatic showings of the theory of operation.

Referring to Figure 1 of the drawing, S is the coil of a galvanometer, which is preferably of the moving coil or D'Arsonval type, but which may also be of the moving magnet type of instrument. I prefer to use the direct reading type of instrument which is provided with the pointer M operated by the coil which cooperates with a scale T.

$A_1$ is the source of unknown E. M. F., the magnitude of which $E_1$ is to be determined. $T_1$ and $T_2$ are the terminals of the instrument and $L_1$ and $L_2$ are the lead wires connecting the source of E. M. F., $A_1$, to the instrument.

The coil S is provided with a tap $a$ between its ends, the tap $a$ being joined at $j$ to the secondary circuit $a_3$, $b$, containing an additional source of E. M. F., $A_3$.

It will be seen that there are three circuit paths between $j$ and $b$, as follows:

Path $P_1$, indicated by $a$, $a_1$, containing the portion $S_1$, of the coil S, and also the source $A_1$ of E. M. F. and leads $L_1$, and $L_2$.

$$\frac{\text{No. of turns in } S_1}{\text{No. of turns in } S_2} = \frac{\text{total resistance of } P_1}{\text{total resistance of } P_2} \quad (3)$$

and if either or both of the resistances $r''_1$ and $r''_2$ are present by making $$\frac{\text{No. of turns in } S_1}{\text{No. of turns in } S_2} = \frac{\text{equivalent resistance of } P_1}{\text{equivalent resistance of } P_2} \times \frac{r''_2(r_1 + r_{s1} + r''_1)}{r''_1(r_2 + r_{s2} + r''_2)} \quad (4)$$

Path $P_2$, indicated by $a$, $a_2$, containing the portion $S_2$, of the coil S.

Path $P_3$, comprising the secondary circuit $a_3$ containing a source of E. M. F. $A_3$.

The function of the source $A_3$ of E. M. F. is to impress a difference of potential between $j$ and $b$ and it is desirable that such difference of potential be variable at will. In Figure 1, one means of producing this variation is shown consisting of a slide wire resistance $r_3$ in parallel with $A_3$ together with the series resistance $r'_3$. But it is understood that any combination of variable and fixed resistances with a constant E. M. F. may be used, or the E. M. F. may be variable, or both, to produce the desired variation in the difference of potential between $j$ and $b$, and further, as some advantages may accrue even the use of a constant difference of potential between $j$ and $b$, it is not necessary to provide means to bring about such variation.

In Figure 1 is shown a combination of parallel and series resistances in the current path $P_2$, namely $r''_2$ in parallel with coil $S_2$, $r_2$ in series with $S_2$ and $r'_2$ in series with the double circuit whose branches contain $r_2$ and $r''_2$ respectively. Also in path $P_1$ is shown the combination of $r''_1$ in parallel with coil $S_1$, $r_1$ in series with $S_1$ and $r'_1$ in series with the double circuit whose branches contain $r_1$ and $r''_1$ respectively. The purpose of these resistances $r_1 \, r'_1 \, r''_1 \, r_2 \, r'_2 \, r''_2$ is to permit balancing the two circuits $P_1$ and $P_2$ in a manner to be herein described, and also, by making these resistances of appropriate magnitude, and of materials of appropriate temperature coefficients of resistance, it is possible to cause the balance of the circuits $P_1$ and $P_2$ and likewise the reading of the instrument to be independent of the temperature of the instrument. In particular cases any combination of the resistance $r_1 \, r'_1 \, r''_1 \, r_2 \, r'_2 \, r''_2$ may be omitted.

There are further shown in Figure 1, switches or keys $K_1$ and $K_3$, and a variable resistance or rheostat V, the purposes of all of which are described later, and of which any or all may be omitted in particular cases.

The magnitude of the several resistances of the circuit, the number of turns in coil $S_1$ and the number of turns in coil $S_2$ are to be proportioned that when an E. M. F. is set up between $j$ and $b$ the currents flowing in coils $S_1$ and $S_2$ respectively will produce equal and opposite deflective forces. This may be obtained in the case when resistances $r''_1$ and $r''_2$ are absent by making in which $r_1 \, r''_1 \, r_2 \, r''_2$ are the parallel and series resistances as indicated in Figure 1, and $r_{s1}$ and $r_{s2}$ are the resistances of coils $S_1$ and $S_2$ respectively, and in which the term "equivalent resistance" is used to indicate the resistance of an equivalent simple circuit. In order that the above condition may obtain for various deflections of the instrument, it is desirable that the turns of $S_1$ and of $S_2$ be similarly spaced with respect to the magnetic field, which may be accomplished by bifilar winding.

Referring to Figure 1, it is seen that the path $P_1$ includes the external circuit, which consists of the leads $L_1$ and $L_2$ and the source of the unknown E. M. F. $A_1$. The resistance of the external circuit is ordinarily variable and its magnitude not directly known. The resistance of $P_1$ is therefore not ordinarily constant and the conditions determined by Equation (3) or Equation (4) can in general be made to obtain only approximately. But it will be hereinafter shown that by means of the circuit as described, the error due to a variation in the resistance of $P_1$ may be made to vanish when the value of the unknown E. M. F. is equal to a predetermined quantity, and such error will be very small when the value of the unknown E. M. F. is in the neighborhood of such predetermined quantity. It will be likewise shown that in any particular case it is possible so to compensate for the variation in the resistance of $P_1$ that the error due to such variation will vanish for all values of the unknown E. M. F.

The principle of operation of my invention will be apparent from the following which is a description of one manner of operation of my invention.

Let $R_1$ = actual resistance of $P_1$
$R_2$ = actual resistance of $P_2$

Further let it be assumed that the instrument has been calibrated for a resistance in $P_1$ equal not to $R_1$ but to $R_1+r$, which is equivalent to assuming that $R_1$ differs from the value used in calibration by the amount $r$. For this to obtain, the number of turns in $S_1$ and in $S_2$ will have been so proportioned, and the scale T so divided, that for unit current flowing in $S_1$ alone, the deflection is $R_1+r$ scale divisions, and for unit current in $S_2$ alone, the deflection is $R_2$ scale divisions.

Let $C_1$ = the current flowing in $P_1$
Let $C_2$ = the current flowing in $P_2$
positive values being assumed when the direction of flow through the coils is from left to right in Figure 1. Then for the assumed conditions, the deflection D of the instrument or measured value of the unknown E. M. F. will be $$C_1(R_1+r) + C_2R_2 \quad (5)$$

Also let $E_1$ = true value of the E. M. F. at $A_1$

The combination of resistances and E. M. F.'s in $P_3$ are equivalent to a single E. M. F. equal to $E_3$, and a single series resistance equal to $R_3$.

Let $C_3$ = current flowing in $P_3$ taken as positive when the direction of flow is upwards in $P_3$ from $b$ towards $j$.

With the key $K_3$ closed and key $K_1$ open, the elements of the circuit $P_3$ are varied until a difference in potential is impressed between $a$ and $b$ equal to an estimated value of the unknown E. M. F. Call this estimated value E and let $$E + e = E_1 \quad (6)$$

This operation consists, in practice, in simply varying the adjustable element of $P_3$ until the instrument indicates a reading E.

Key $K_1$ is then closed; ($K_3$ being kept closed throughout) the instrument will now read $E_1 + \Delta E_1$ where $\Delta E_1$ is the error due to $r$, the variation in resistance. Then $$E_1 + \Delta E_1 = C_1(R_1+r) + C_2R_2. \quad (7)$$

The magnitude of $\Delta E_1$ is calculated as follows:

$$\frac{E_3}{R_2+R_3} = \frac{E}{R_2}$$

$$E_3 = \frac{E(R_2+R_3)}{R_2} \quad (8)$$

$$C_3 = C_2 - C_1 \quad (9)$$

As the difference in potential between $j$ and $b$ is the same for each of the three circuits $P_1$, $P_2$, and $P_3$, we have $$E_1 - C_1R_1 = C_2R_2 = E_3 - C_3R_3 \quad (10)$$

Substituting from (8) and (9) and solving for $C_1$ and $C_2$ $$C_1 = \frac{E_1}{R_1} - \frac{E_1R_2R_3 + E(R_2+R_3)R_1}{R_1(R_1R_2+R_2R_3+R_1R_3)} \quad (11)$$

$$C_2 = \frac{E_1R_2R_3 + E(R_2+R_3)R_1}{R_2(R_1R_2+R_2R_3+R_1R_3)} \quad (12)$$

The reading of the instrument is found by substituting the above values of $C_1$ and $C_2$ in Equation (7), at the same time writing $E = E_1 - e$ from Equation (6).

$$E_1 + \Delta E_1 = E_1 + er\frac{(R_2+R_3)}{R_1R_2+R_2R_3+R_1R_3} \quad (13)$$

or $$\Delta E_1 = \frac{er(R_2+R_3)}{R_1R_2+R_2R_3+R_1R_3} \quad (14)$$

Equation (14) shows that $\Delta E_1$ depends not upon the whole E. M. F. $E_1$, but upon a small quantity $e$, and can be made to disappear entirely by making $e = o$. In the drawing, Figures 3 and 4 show graphically the relationship between $E_1$ and $\Delta E_1$. Figure 3 is the condition that obtains in a simple millivoltmeter without the circuit $P_3$, while Figure 4 is the condition that obtains in an instrument as comprised in my invention. In these two figures abscissas represent values of $E_1$, while ordinates represent values of $\Delta E_1$.

It is apparent that if $K_1$ is alternately opened and closed while the elements in circuit $P_3$ are varied until the instrument gives equal readings when $K_1$ is open and $K_1$ is closed, $e$ becomes zero, and $\Delta E_1$ disappears.

It is likewise apparent that if $e$ is made of considerable magnitude, and $K_3$ is alternately opened and closed while resistance V is adjusted until the instrument gives equal readings when $K_3$ is open and when it is closed, $r$ becomes equal to zero, and $\Delta E_1$ disappears for all values of E and $E_1$.

The manner in which the compensating adjustments of the instrument are made will vary with the circumstances under which the instrument is used. Under some conditions it may be desired to adjust the instrument to its compensated setting prior to the time when the thermocouple $A_1$ has reached the desired temperature. Under such conditions the deflection of the instrument for the desired temperature is determined. For this purpose the key $K_1$ is opened, which cuts the thermocouple out of the circuit and the slide wire contact is manipulated until the instrument indicates the desired deflection. The key $K_1$ is then closed and when the furnace reaches the proper temperature the reading will be properly compensated and corrected.

Under other conditions it may be desired to obtain a corrected reading of the then existing temperature. For this purpose the key $K_1$ is manipulated repeatedly to the open and closed position with one hand while the slide wire contact is manipulated with the other hand until the reading is the same when $K_1$ is closed or open.

The variable resistance V, which may be omitted if desired, may be used for correcting the instrument, by manipulating the key $K_3$ from its closed to its open position repeatedly while the resistance V is varied until the deflection is the same when the key $K_3$ is open or closed. This manner of compensation will give the instrument a high degree of accuracy over its entire scale. This method may be combined with a subsequent manipulation as described in the two preceding paragraphs for any specific point on the scale.

When the adjustments are completed as described above the reading are taken with keys $K_1$ and $K_3$ closed.

A method of impressing a potential difference between $a$ and $b$, other than has been previously described, is the following: The source of $A_3$ of E. M. F. may be such that the magnitude of the E. M. F. produced by it is approximately the same as $E_1$. One way of obtaining this condition is to make $A_3$ similar to $A_1$ and subjected to approximately the same conditions. In a particular case, illustrated in Figure 2, $A_1$ and $A_3$ may be similar thermocouples, with their hot junctions exposed to the heat of the same furnace, and these two thermocouples may be placed in the same protecting tube. If $R_3$ is small, which may be brought about by making the leads to couple $A_3$ of material with a high conductivity, $E_3$ will be nearly equal to $E_1$ for all possible values of the latter, and $\Delta E_1$ will be correspondingly small. When this method is employed, the resistances $r_3$, $r'_3$ and V may generally be omitted, as may also keys $K_3$ and $K_1$, although keys $K_3$ and $K_1$ may be advantageously retained in order to facilitate checking of connections and determining the presence of possible short or open circuits.

If an unknown resistance is inserted in $P_1$, it can be compensated for by an equal and opposite change in V. The principle of the preceding paragraph may therefore be used as the basis of a method of measuring resistance. To accomplish this it is necessary that V be calibrated and divided into units of resistance. For the purpose of measuring resistance alone, it is not necessary that the instrument be calibrated other than by the calibration of resistance V.

The advantages to be obtained by the use of the apparatus comprised in my invention include the following:

(1) The practical elimination of errors due to variations in resistance.

(2) The possibility of still obtaining (1) even when the instrument is constructed with low internal resistance, whereby the instrument may be made sturdy and free from the liability to mechanical derangement, and at the same time both sensitive and accurate.

(3) The possibility of employing high resistance leads, as for example the usual extension leads, while still retaining in great part the advantages (1) and (2).

(4) The instrument may take the form of a continuous reading deflection instrument.

(5) The auxiliary resistances and sources of E. M. F. employed in the construction of the instrument need not be calibrated or their value directly known. The advantages of the apparatus are thus obtained without the use of a standard cell or of a calibrated slide wire, which makes the construction of the instrument less expensive than if it were necessary to use such standard cell or calibrated slide wire.

I claim:

1. In a pyrometric system, the combination of a thermo couple, a galvanometer having a current carrying coil connected to said thermo couple, and a source of electromotive force approximately equal to the electromotive force of the thermo couple connected to an intermediate point of said coil and to the thermo couple.

2. In a pyrometric system the combination of a thermo couple generating an electromotive force varying with the temperature, a galvanometer having a current carrying coil connected to said thermo couple, and means for impressing a variable electromotive force across a portion of said coil approximately equal to the E. M. F. generated by the thermo couple.

3. A pyrometric system comprising a thermo couple, a galvanometer having a current carrying coil connected across said thermo couple for measuring the voltage of the thermo couple, a source of electromotive force, means for connecting said source to an intermediate point on said coil and to the thermo couple comprising a manually operable switch, and another manually operable switch in the connection between the galvanometer and the thermo couple.

4. A pyrometric system comprising a galvanometer coil, a pair of thermo-couples each having a negative and a positive terminal, a circuit connection connecting one end of said coil to like terminals of said thermo-couples, a circuit connection between the remaining terminal of one couple and the remaining terminal of the coil, and a circuit connection between an intermediate point on said coil and the remaining terminal of the remaining couple.

In testimony whereof, I have signed my name to this specification.

CHARLES TRAVIS.